United States Patent [19]

Bukoschek et al.

[11] Patent Number: 4,696,166
[45] Date of Patent: Sep. 29, 1987

[54] ICE-CREAM MAKER

[75] Inventors: Romuald L. Bukoschek; Reinhard Huszar, both of Klagenfurt, Austria

[73] Assignee: U.S. Philips Corporation, New York, N.Y.

[21] Appl. No.: 877,630

[22] Filed: Jun. 23, 1986

[30] Foreign Application Priority Data

Jun. 26, 1985 [AT] Austria ................................. 1902/85

[51] Int. Cl.⁴ ............................................. A23G 9/12
[52] U.S. Cl. ........................................ 62/136; 62/343; 366/601
[58] Field of Search ................... 62/342, 343, 136; 366/601; 241/36; 318/282

[56] References Cited

U.S. PATENT DOCUMENTS 4,205,535  6/1980  Maurer ................................. 62/342
4,392,361  7/1983  Cavalli ................................. 62/343
4,402,194  9/1983  Kuwako et al. ..................... 62/353
4,545,216 10/1985  Cavalli ................................. 62/343

Primary Examiner—William E. Tapolcai
Attorney, Agent, or Firm—Thomas A. Briody; William J. Streeter; Rolf E. Schneider

[57] ABSTRACT

An ice-cream maker with a cylindrical container (1), inside which at least one cooled surface is provided for ice-cream formation, and with an electric motor (4), which through a gear unit (5) drives a shaft (6) running central to the container, said shaft bearing a scraper and stirrer tool (8) acting at least together with the cooled surface. An autosynchronous single-phase motor is provided as the electric motor and the scraper and stirrer tool has for both directions of rotation of the shaft at least one scraper and stirrer tool section (10,11) effective principally in the relevant direction of rotation.

6 Claims, 4 Drawing Figures

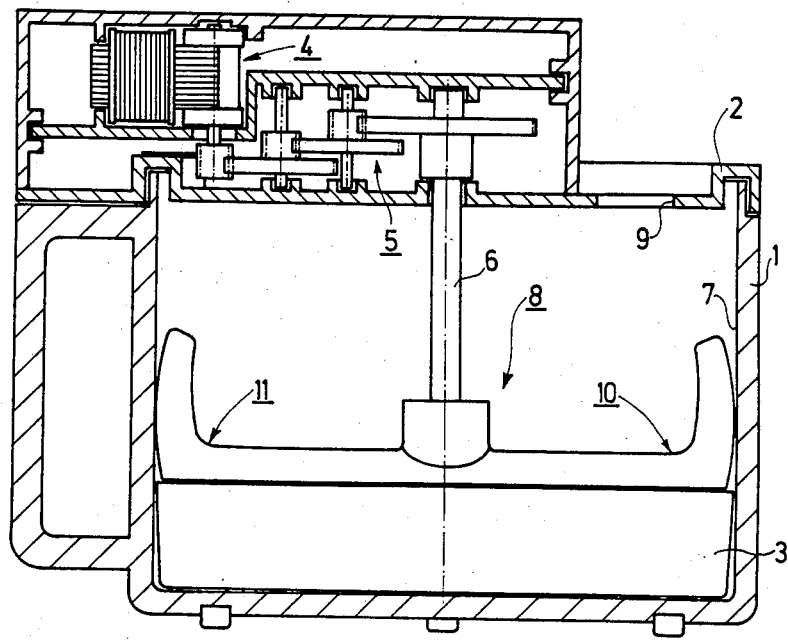
Fig.1
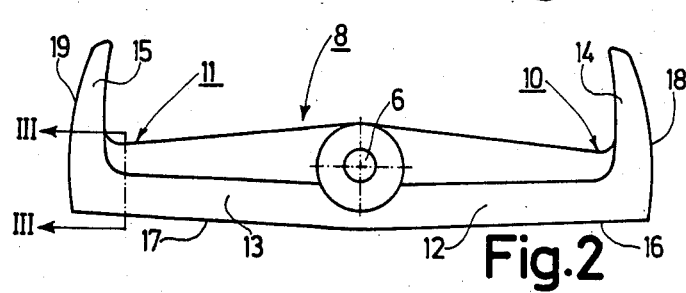
Fig.2
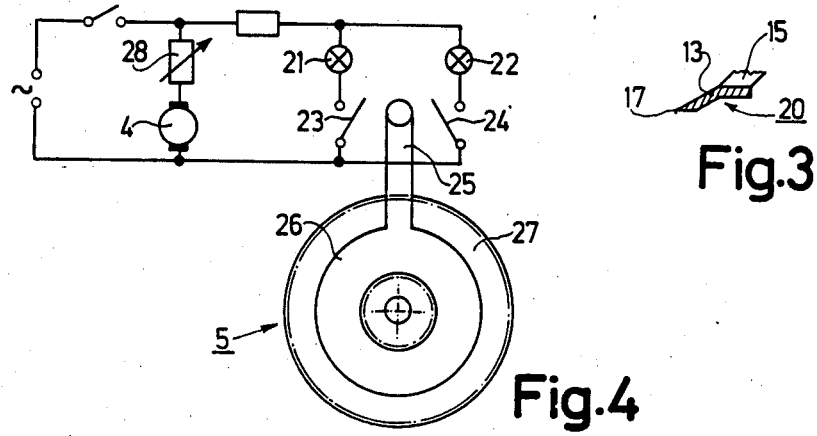
Fig.3
Fig.4

ICE-CREAM MAKER

BACKGROUND OF THE INVENTION

The present invention relates to an ice-cream maker with a cylindrical container, inside which at least one cooled surface is provided for ice-cream formation, and including and electric motor through which a gear unit drives a shaft running central to the container. The shaft contains a scraper and stirrer tool acting together with the cooled surface. Such ice-cream makers, used as domestic appliances are known in many diverse embodiments, particularly as a cooled surface for ice-cream formation. Pat. No. DE-OS 28 31 592 shows an ice-cream maker, having a container in which a substantially discoid cold cartridge is insertable, whereby the surface of the cold cartridge faces away from the base of the container and forms the cooled surface for ice-cream formation. In another embodiment shown in U.S. Pat. No. 3 921 961 a container is designed as a cold cartridge its inner cylindrical surface forming the cooled surface for ice-cream formation. In a further embodiment shown for example in EP-OS No. 0 106 814, a container is provided with its own cooling device, whereby both its inner bottom surface and its inner cylindrical surface form a cooled surface for ice-cream formation.

SUMMARY OF THE INVENTION

The object of the invention is an improvement of an ice-cream maker as discussed above with respect to its contruction and manner of operation. This object is achieved according to the present invention, by provision of an autosynchronous single-phase motor as the electric motor and the scraper and stirrer tool having for both directions of rotation of the shaft at least one scraper and stirrer tool section effective principally in the relevant direction of rotation. Several advantages are obtained with an autosynchronous single-phase motor provided as the electric motor. Single-phase synchronous motors with relatively small dimensions are capable of providing high performance, which is required for compact domestic appliances. It is known that the direction of rotation in which a single-phase synchronous motor starts up is not fixed, so that it may start up in one of the two directions of rotation according to the relevant starting conditions. In the event of overload it changes its direction of rotation. For many applications this is undesirable, and for this reason a certain direction of rotation is fixed through the incorporation of a changer-over lock. In the present invention, however, the aforementioned characteristics of a single-phase synchronous motor are used to advantage in conjunction with the design of the scraper and stirrer tool in that for both directions of rotation it has at least one scraper and stirrer tool section moving in the relevant direction of rotation. This ensures that, independently of the direction of rotation in which the single-phase synchronous motor starts up, ice-cream production occurs efficiently. Furthermore, as a result of reversal of rotation when the single-phase synchronous motor is overloaded, the locally restricted denser formations of ice-cream on the cooled surface, occurring in ice-cream of non-uniform consistency will be scraped off efficiently. The single-phase synchronous motor reverses its rotation if one scraper and stirrer tool section does not succeed in scraping, after which the other section starts scraping off in the other direction of rotation. Under certain circumstances, this procedure may also be repeated several times until the local compacted ice-cream formation has been completely scraped off. A single-phase synchronous motor also has a greater degree of protection against overload than other electric motors due to the automatic reversal of rotation, so that additional overload protection devices such as temperature or time switches are unnecessary.

It is advantageous for two scraper and stirrer tool sections, effective principally in one of the two directions of rotation, to be positioned inversely to the shaft. In this manner, an efficient distribution of the ice-cream mixture and scraping off of ice-cream building up on the cooled surface is achieved in both directions of rotation with a simple design of the tool. It is possible for several such pairs of scraper and stirrer tool sections to be provided.

It is further advantageous for the scraper and stirrer tool sections to be provided with a recess facing the cooled surface on their sections, acting together with the cooled surface in the direction of rotation opposite to the scraping. In this manner the scraper and stirrer tool section not employed in scraping in the relevant direction of rotation and turning in the opposite direction, pushes the ice-cream mixture in front of it as a result of the recess on its front side and distributes it uniformly over the cooled surface. This promotes the cooling of the ice-cream mixture and results in a more uniform formation of the ice-cream.

It is advantageous for the maximum emissible moment from the single-phase synchronous motor to be selected according to the lowest required temperature of the ice-cream, whereby on reaching this temperature the single-phase synchronous motor successively changes its direction of rotation and the scraper and stirrer tool thus executes a pendulum movement. In this way, in the final phase of ice-cream formation, at an increasing stiffness and decreasing temperature of the ice-cream mixture, a frequent change in the direction of rotation of the single-phase synchronous motor occurs, as resulting in the ice-cream collecting on the cold cartridge being scraped off more efficiently and distributed more uniformly by mixing in alternating direction so that no lumps can be formed. When the ice-cream has reached the lowest required temperature, the scraper and stirrer tool commences a distinct pendulum movement, which prevents the single-phase synchronous motor from being overloaded and indicates the readiness of the ice-cream.

It is also advantageous to control the maximum torque delivered by the single-phase synchronous motor by means of an adjustable series resistor incorporated in the motor circuitry. In this way the lowest temperature to be reached by the ice-cream can be simply selected.

It is also advantageous to provide an indicting device for each of the two directions of rotation. In this way the successive reversals of rotation can be simply observed and thus the degree of readiness of the ice-cream can be established. The indicating devices may take the form of optical or acoustic devices which can be switched on and off by switches.

The indicating devices can be simply operated by a switching arm connected to a wheel of the gear unit by means of a friction coupling.

The invention will be described in further detail with regard to the drawing, which shows an embodiment of the invention, however it should not be restricted thereto.

BRIEF DESCRIPTION OF THE DRAWINGS

FIG. 1 shows an ice-cream maker according to the invention, partially in section in side elevation.

FIG. 2 shows the scraper and stirrer tool of the ice-cream maker according to FIG. 1 in plan view.

FIG. 3 shows the scraper and stirrer tool according to FIG. 2 in section along the line III—III in FIG. 2.

FIG. 4 shows, diagrammatically, the indicating devices for each of the directions of rotation of the single-phase synchronous motor and its circuitry, in which an adjustable series resistor is incorporated.

DESCRIPTION OF THE PREFERRED EMBODIMENT

In FIG. 1, a thermally insulated cylindrical container 1, closable by means of a suitably lockable cover 2 is provided. A discoid cold cartridge 3 is inserted into container 1, containing a latent heat storage medium. The surface of the cold cartridge 3 facing from the base of the container 1 forms a cooled surface for ice-cream formation. The cover 2 accommodates an electric motor 4, which through a gear unit 5, in the form of a three-step toothed-wheel gearing drives a shaft 6 running central to container 1. The shaft 6 bears a scraper and stirrer tool 8 acting together with the cooled surface of the cold cartridge 3 for ice-cream formation and the container wall 7. If required, the electric motor 4 may constitute, together with the gear unit 5 an assembly separable from the lid 2. The shaft 6 may also be releasable from the gear unit along with the scraper and stirrer tool 8 by means of a plug connection. A spring arrangement may be provided between the gear unit 5 and the shaft 6, to keep the scraper and stirrer tool under spring pressure against the cooled surface of the cold cartridge 3 serving for ice-cream formation, so that the scraping off of ice-cream forming on the cold cartridge occurs as efficiently as possible.

Before using of the ice-cream maker, the cold cartridge 3 is cooled, for example, in the freezer compartment of a refrigerator, and subsequently inserted into container 1. The cover 2 with scraper and stirrer tool 8 is then placed onto the container 1 An ice-cream mixture is then poured into the filling opening 9 provided in the cover 2. After switching on the electric motor 4, the scraper and stirrer tool 8 begins to turn, whereby the ice-cream mixture is mixed and any ice-cream forming on the cold cartridge is scraped off an mixed back into the ice-cream mixture. This continues until only ice-cream with the required temperature and consistency remains.

In an ice-cream maker of this type an autosynchronous single-phase motor is provided as the electric motor 4, having relatively small dimensions, which is capable of offering a high performance. It is known that the direction of rotation in which a single-phase synchronous motor starts up is not fixed, so that the shaft 6 can be driven in one of the two directions of rotation. Accordingly, the scraper and stirrer tool 8 has for both directions of rotation of the shaft 6 at least one scraper and stirrer tool section, 10 and 11 respectively, effective principally in the relevant direction of rotation. In this particular embodiment such a scraper and stirrer tool section 10 and 11, positioned inversely to the shaft 6, as shown in FIG. 2, is provided for each of the two directions of rotation of the shaft 6. Each of these scraper and stirrer tool sections 10 and 11 has a section, 12 and 13 respectively, projecting from the shaft 6 and acting together with the cold cartridge 3 and a section, 14 and 15 respectively, angled away from the latter acting together with the container wall 7 and having the shape of a scoop, effecting mixing and stirring of the ice-cream mixture. As can be seen from FIG. 2, the edge 16 of section 12 lies foremost when the scraper and stirrer tool is rotating clockwise, whereas in counterclockwise rotation, the edge 17 of section 13 lies foremost so firstly edge 16 and secondly edge 17 effect a scraping off of the ice-cream forming on the cold cartridge. The same applies to edges 18 and 19 of sections 14 and 15, which act together with the container wall 7. As is clear from FIG. 3, for section 13, the edges 16 and 17 are formed by wedge-shaped inclined planes on the sections 12 and 13, so that an excellent scraping effect is achieved. It is also preferable the edges 16 and 17 to form together a slightly blunt angle, as shown in FIG. 2. It is possible to provide for each direction of rotation of the shaft 6 more than just the one scraper and stirrer tool section 10 and 11 effective in the relevant direction or rotation, and arranged accordingly at offset angles on the shaft 6.

As seen in FIG. 3, the sections 12 and 13 of the scraper and stirrer tool sections 10 and 11, acting together with the cooled surface of the cold cartridge 3, are provided with a recess facing the cooled surface of the cold cartridge 3 in the direction of rotation opposite to the scraping. In FIG. 3 the recess provided on section 13 is indicated by 20. It ensures that when the corresponding section 10 or 11 of the scraper and stirrer tool turns in the direction opposite to the scraping, the corresponding recess pushes the ice-cream mixture in front of it and thus deposits it on the cooled surface of the cold cartridge 3, increasing temperature exchange between the cold cartridge and the ice-cream mixture and speeding up the formation of ice-cream. As seen in FIG. 3, in this embodiment the cross section of the recess 20 is rhombic. There are, of course, other possibilities for the cross sectional shape of the recesses, such as spherical or wedge-shaped.

It is known that an autosynchronous single-phase motor has the characteristic of automatically reversing its direction of rotation on overload which is advantageous in the present invention. During formation of the ice-cream on the cooled surface of the cold cartridge, it is possible that there is a locally restricted, compacted formation of ice-cream, if the consistency of the ice-cream mixture is not uniform. Such a compacted formation of ice-cream may possibly not be scraped off from the cold cartridge by the scraper and stirrer section effective in the relevant direction of rotation, which then leads to a locking of the scraper and stirrer tool and thus of the single-phase synchronous motor. In such a case, the single-phase synchronous motor reverses its rotation, so that the other scraper and stirrer tool section assigned to this direction of rotation strikes the compacted ice-cream formation and attempts to scrape if off. Should this not succeed, the single-phase synchronous motor will change its direction of rotation once again, so that the scraper and stirrer tool section assigned to the initial direction of rotation again strikes the compacted ice-cream formation from the corresponding side and once again attempts to scrape this off. This process will continue until such a compacted ice-cream formation has been completely scraped off the cold cartridge. In this way, it is ensured that the formation of ice-cream continues efficiently without malfunction. As a result of the continuous change in the direction of rotation of the single-phase synchronous motor it is also guaranteed that the latter is not overloaded, thus eliminating the need for an additional overload protection. If required, it is possible to provide a coupling with limited backlash as is customary in drives with a single-phase synchronous motor and as a result of which, its starting behavior is improved and a further overload protection is provided through the possibility of a reversal of rotation. This would be in the path of the transmission of force from the single-phase synchronous motor to the shaft bearing scraper and stirrer tool, for example between the shaft and the driven side of the gear unit.

It is advantageous for the maximum torque delivered by the single-phase synchronous motor, to be selected according to the lowest required temperature of the ice-cream, determined in known manner from the parameters definitive for the dimensioning of the motor upon reaching this temperature, the single-phase synchronous motor successively changes its direction of rotation and the scaper and stirrer tool thus executed a pendulum movement. In this way, in the final phase of ice-cream formation, at an increasing stiffness and decreasing temperature of the ice-cream mixture, there follows a frequent reversal of rotation of the single-phase synchronous motor, as a result of which the ice-cream forming on the cold cartridge is scraped off more efficiently and is distributed more uniformly, mixing with alternating direction of rotation. When the ice-cream has reached the lowest required temperature, the scraper and stirrer tool then begins a distinct pendulum movement, which prevents the single-phase synchronous motor from being overloaded and indicates the readiness of the ice-cream.

In order to recognize the readiness of the ice-cream, an indicating device has been provided for each of the two directions of rotation. As shown in FIG. 4 two incandescent lamps 21 and 22, are alternately switched on and off by two switches 23 and 24. To activate switches 23 and 24, a switching arm 25 is provided, which projects from a disc 26, arranged coaxially to a wheel 27 of the gear unit 5 and connected to this wheel 27 by means of a friction coupling, not shown here. In this way the switching arm 25 is moved along in each of the two directions until it has activated one of the corresponding switches 23 or 24 and either the incandescent lamp 21 or 22 has lit up. A pendulum movement of the scraper and stirrer tool then results in a continuously alternating lighting up to the two incandescent lamps 21 and 22, as a result of which it is established that the ice-cream is ready. In the place of an optical indicating device, it is possible to incorporate an acoustic indicator with two different tones. There are certainly further possibilities for the design of such indicating devices within the scope of the prior art.

As also seen from FIG. 4, it is suitable for the maximum torque delivered by the single-phase synchronous motor 4 to be controllable by means of an adjustable series resistor 28 incorporated in the motor circuitry. In this way, the lowest temperature which the ice-cream should reach can be selected simply by allowing the pendulum motion of the scraper and stirrer mechanism to commence earlier or later, according to the temperature-dependent stiffness of the ice-cream.

As is shown, a wide range of variations of the aforementioned embodiment are possible without departing from the scope of the invention. In this context, it should also be mentioned in particular that the measures according to the invention are not only applicable to an ice-cream maker in which a discoid cold cartridge is used, but also to ice-cream makers, which have differently designed cooled surfaces for ice-cream formation. A cold cartridge with a hollow cylindrical form could thus be used, in which case the scraper and stirrer tool then act together with the internal cylindrical surface of the cold cartridge. It would also be possible to use a cylindrical cold cartridge centrally insertable into a container, whereby the scraper and stirrer tool embracing the cold cartridge on the outside acts together with the cylindrical surface of the cold cartridge. It is also possible for the cylindrical container as a whole to be designed as a cold cartridge or to be cooled by its own cooling devices, whereby the scraper and stirrer tool then act together with the inner walls.

What is claimed is:

1. An ice-cream maker comprising:
   a cylindrical container provided with at least one cooled surface for ice-cream formation, a shaft positioned concentrically within said container, an autosynchronous single-phase electric motor driving said shaft through a gear unit;
   a scraper and stirrer tool mounted on said shaft and co-acting with the cooled surface, said scraper and stirrer tool including for each direction of rotation of the shaft, at least one section effective substantially in the direction of rotation, said sections positioned symmetrically with respect to a plane of symmetry through said shaft.

2. An ice-cream maker according to claim 1 wherein the scraper and stirrer tool sections include portions which cooperate with the cooled surface in the direction of rotation opposite to scraping of said cool surface, wherein each of said portions is provided with a recess facing the cooled surface.

3. An ice-cream maker according to claim 2 wherein the maximum torque delivered by the single-phase synchronous motor is selected for a lowest required temperature of the ice-cream, and upon reaching said temperature, the motor successively changes its direction of rotation, whereby the scraper and stirrer tool executes a pendulum movement.

4. An ice-cream maker according to claim 3 wherein the maximum torque delivered by the single-phase synchronous motor is controllable by an adjustable series resistor incorporated in the motor circuitry.

5. An ice-cream maker according to claim 4 further provided with an indicating device for each of the two directions of rotation.

6. An ice-cream maker according to claim 5 wherein the indicating devices are actuated by a switching arm which is connected to a wheel of the gear unit by means of a friction coupling.

* * * * *